L. S. HACKNEY.
MANURE SPREADER.
APPLICATION FILED FEB. 20, 1908.

927,141.

Patented July 6, 1909.
3 SHEETS—SHEET 3.

WITNESSES

INVENTOR
LESLIE S. HACKNEY
BY Paul & Paul
HIS ATTORNEY

UNITED STATES PATENT OFFICE.

LESLIE S. HACKNEY, OF ST. PAUL, MINNESOTA.

MANURE-SPREADER.

No. 927,141.

Specification of Letters Patent.

Patented July 6, 1909.

Application filed February 20, 1908. Serial No. 416,820.

*To all whom it may concern:*

Be it known that I, LESLIE S. HACKNEY, of St. Paul, Ramsey county, Minnesota, have invented certain new and useful Improvements in Manure-Spreaders, of which the following is a specification.

The object of my invention is to provide a manure spreading apparatus adapted to be placed in the box of an ordinary farm wagon or removed therefrom to adapt the wagon for hauling or for other purposes.

A further object is to provide a spreading apparatus which will operate on the rear end only of the load moving it toward the spreading reel in much the same manner as the manure would be drawn back out of the wagon with a hand fork.

A further object is to provide a manure spreading apparatus capable of operation with less draft than is usually required in machines of this character.

A further object is to provide an apparatus capable of attachment and use with different lengths of wagon boxes.
The invention consists generally in various constructions and combinations, all as hereinafter described and particularly pointed out in the claims.

Figure 1:
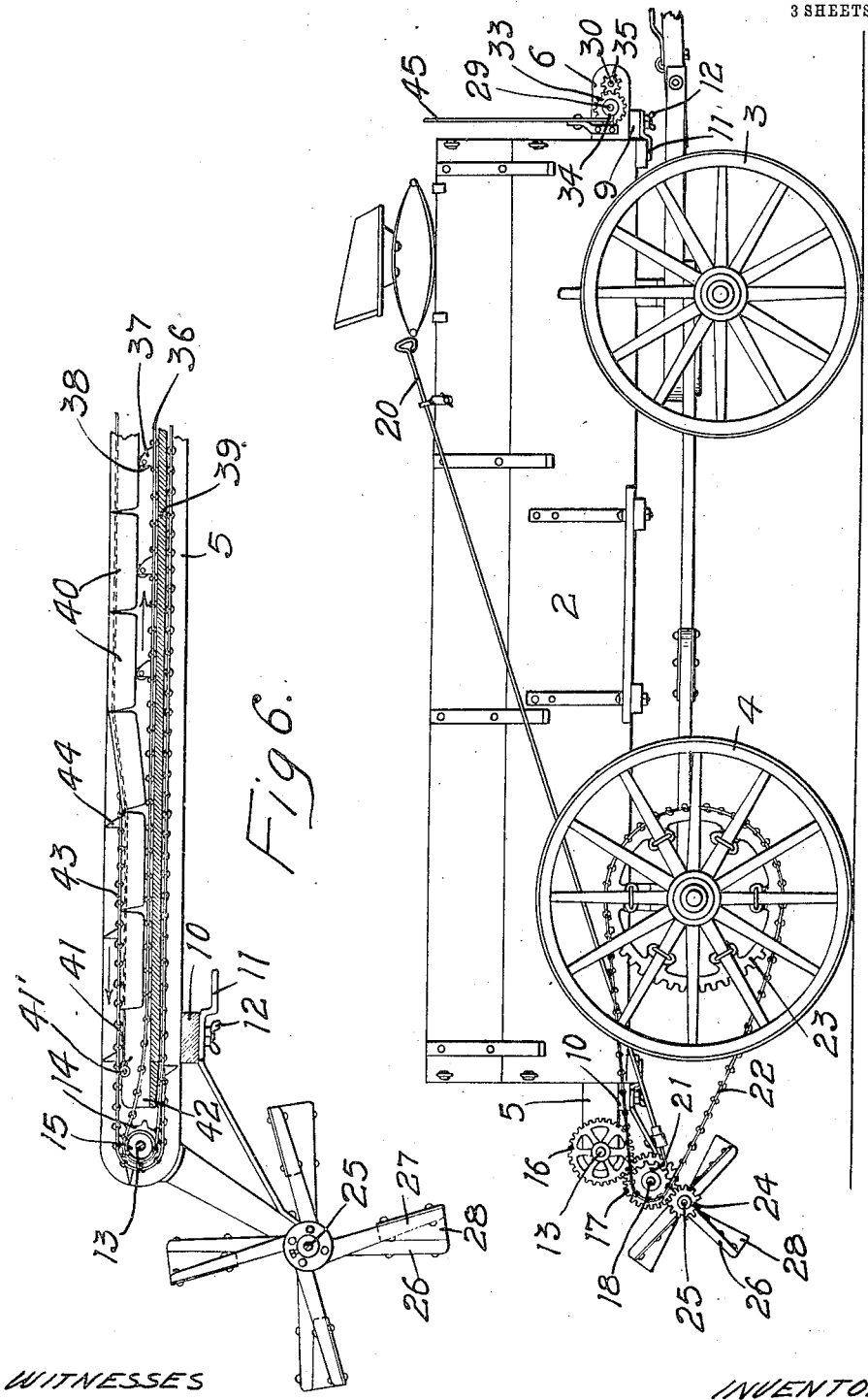
Figure 2:
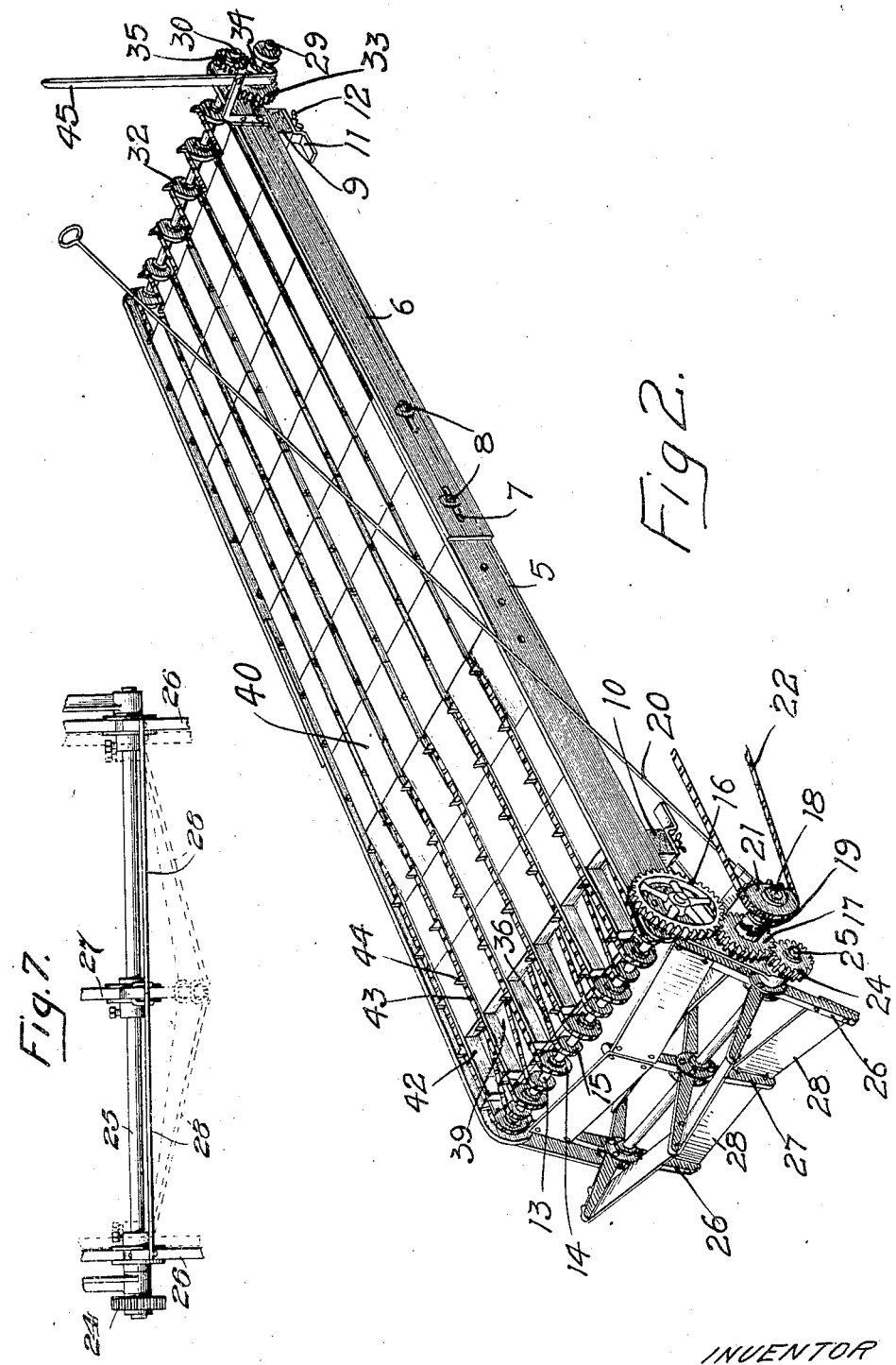
Figure 3:
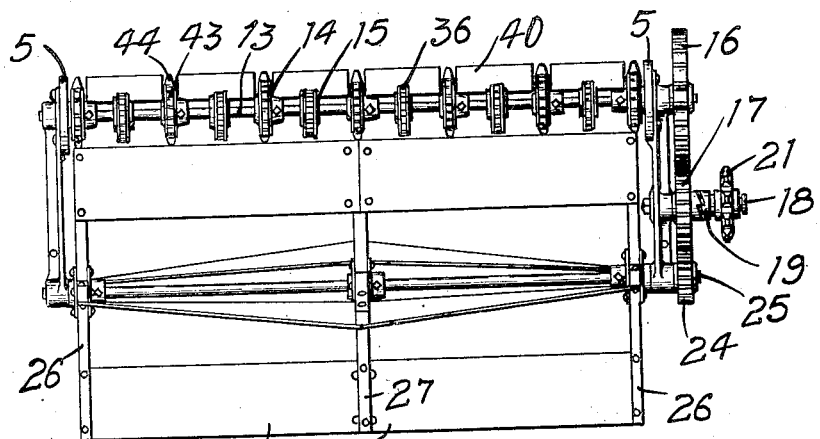
Figure 4:
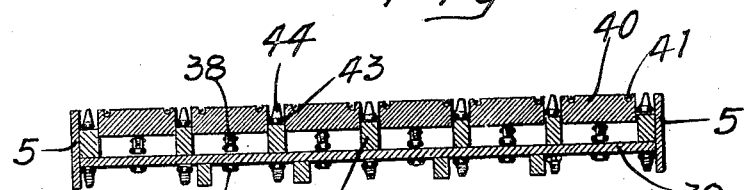
Figure 5:
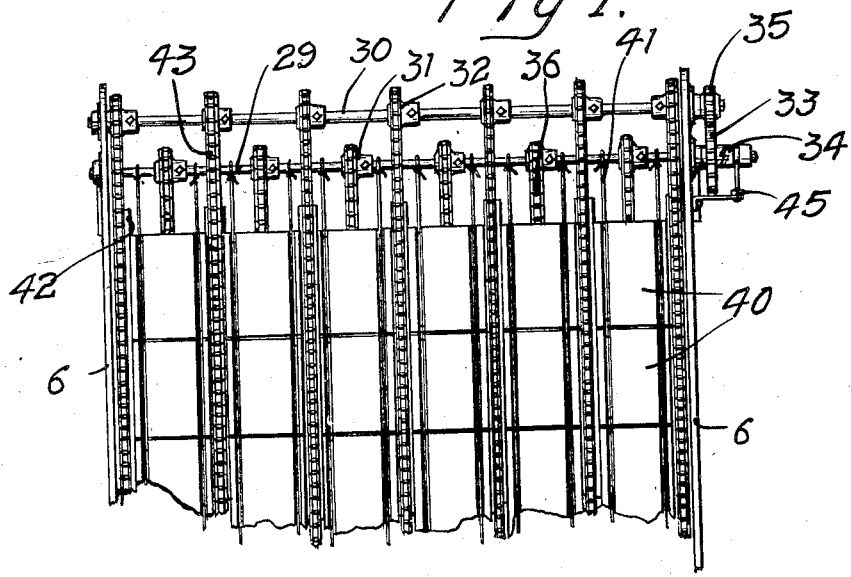

In the accompanying drawings, forming part of this specification, Figure 1 is a side elevation of a manure spreading wagon embodying my invention. Fig. 2 is a perspective view of the apparatus removed from the wagon box. Fig. 3 is a rear end view of the same. Fig. 4 is a transverse sectional view of the bed or bottom, illustrating the normal position of the feed chains thereon. Fig. 5 is a top view of the forward end of the apparatus showing the mechanism at that point
for operating the feed chains. Fig. 6 is a detail sectional view illustrating the means for raising and lowering the removable floor upon which the load is placed. Fig. 7 is a detailed view illustrating the adjustable character of the spreading reel or beater.

In the drawing; 2 represents a wagon box having forward and rear axles and carrying wheels 3 and 4. Within this wagon box the manure-spreading apparatus is placed resting upon the bottom of the box. The apparatus consists of side boards composed preferably of sections 5 and 6 having ends arranged to lap by one another and adjustably secured together by means of slots 7 and bolts 8. Upon loosening these bolts the side boards can be adjusted to adapt the device for wagon boxes of different lengths. Cross bars 9 and 10 are provided near the forward and rear ends of the side boards, carrying clamps 11 and thumb screws 12 by means of which the frame of the spreader can be rigidly secured to the bottom of the wagon box, the clamps extending in under cross bars on the box as indicated in Fig. 1. I am thus able by removing the end boards of the wagon to place the spreader apparatus in a wagon box and secure it thereto to adapt the wagon for hauling manure, and as readily remove the apparatus from the box when it is desired to use the wagon for other purposes.

By means of the adjustment described above the frame of the apparatus can be fitted to boxes of different lengths. At the rear end of the spreader frame is a transverse shaft 13 having a series of sprocket wheels 14 secured thereon at intervals and a series of sprocket wheels 15 loosely mounted on the shaft 13 intermediate to the wheels 14. A gear 16 is secured on the shaft 13 meshing with a pinion 17 loosely mounted on a shaft 18 and arranged to be locked on the shaft by a clutch mechanism 19 that is operated by a rod 20 extending to the forward end of the apparatus. A sprocket wheel 21 is secured on the shaft 18 and a drive chain 22 connects the sprocket 21 with a large sprocket wheel 23 that is secured to one of the rear wheels 4 of the wagon. The gear 17 meshes with a pinion 24 on a shaft 25 and upon this shaft I provide spiders 26 and 27, the spiders 26 being located at the ends of the shaft and the spider 27 near the middle thereof. The arms of the spider 27 are turned forward or in advance of the corresponding arms of the end spiders see Fig. 6 and are connected therewith by blades or paddles 28, which engage the manure as it is delivered from the wagon and distribute it evenly over the ground. At the forward end of the spreader frame are two shafts 29 and 30 upon which sprocket wheels 31 and 32 are secured alternating in position with one another. The shaft 29 has a gear 33 loosely mounted thereon and locked by means of a clutch device 34 and arranged to mesh with a pinion 35 on the shaft 30.

The sprocket wheels 31 and 15 are connected by a corresponding number of chains 36, said chains being provided on one-half of their length with teeth 37 having anti-friction rollers 38 in their outer ends. A stationary floor 39 is provided between the side rails of the spreader frame and the chains 36 operate on this floor. Above this stationary floor is a movable one made up of a series of blocks 40 arranged in parallel rows extending lengthwise of the spreader frame and strung on wires 41 that are attached to the shaft 29 and to a rod 41' near the shaft 13. The blocks are capable of rising and falling in the spreader frame to render the feed chains operative or inoperative.

Between the rows of blocks, bars 42 are provided and upon these bars the feed chains 43 are adapted to slide, said chains being provided with a series of feed lugs 44. These lugs, when the movable block floor of the spreader is raised, are on a level with or below the top of said floor and consequently their movement will have no effect upon the load of manure resting on the spreader frame. As soon, however, as the chains 36 are set in motion and their supporting teeth are withdrawn from beneath the movable floor, as indicated in Fig. 6, the blocks will drop down exposing the feed lugs, which digging into the manure will feed it backwardly to the spreading reel. The feed chains, it will be noticed, operate continuously through the shafts 13 and 30. By means of the clutch mechanism and the operating lever 45 the driver can render the chains 36 operative or inoperative, as desired. The teeth of these chains extend for about one-half the length of the chains or a distance corresponding to the length of the movable floor of the spreader. When the wagon is ready for its load these chains will be adjusted so that the movable floor will be in its raised position and the teeth of the feed chains being below the said floor will be inoperative. When the driver wishes to discharge a portion of the load he will operate the clutch 34 and set the chains 36 in motion whereupon the teeth thereon will move forward allowing successive transverse sections of the blocks to drop down and expose the feed lugs. When the chains 36 have moved the desired distance they may be stopped and allowed to remain stationary while the feed chains are discharging the rear end of the load, the forward portion thereof being held up by the movable floor out of contact with the feed chains and will remain unobstructed during the operation of discharging the rear portion. As fast as the rear of the load is fed to the spreading cylinder additional sections of the movable floor may be lowered to expose another portion of the load to the action of the feed lugs. In this way I am able to feed a portion of the load at a time avoiding the necessity of moving the entire load or of operating feed chains through the entire load and thereby effect a considerable saving in the power required to operate the feeding mechanism.

I believe that a machine made in this way will have less draft and will feed the manure more satisfactorily than in machines where the entire load is fed back bodily to the spreading cylinder.

The floor of the spreading apparatus extends back to a point near the shaft 13 to prevent fine manure from dropping down between the floor and the spreading reel. The material discharged over the end of the floor will be caught by the revolving reel and evenly distributed.

The spiders of the spreading reel have hubs that are adjustable lengthwise of the shaft on which they are mounted or in a rotary direction with respect thereto, said hubs being secured by said screws on the shaft as indicated in Fig. 6. The blades of the reel are hinged by means of staples, as indicated, to the arms of the center spider, such connection allowing the middle spider to be loosened and rotated until the reel assumes the form shown in Fig. 3 or the outer spiders may be loosened and turned backward to produce the same effect. This arrangement of the reel blades causes the manure or other material that is being spread, to be thrown out laterally on each side of the wagon.

I claim as my invention:

1. The combination, with a wagon box, of a flexible floor arranged therein and capable of moving vertically, a feeding means operating toward the rear end of said box and normally below the level of said floor, and means for lowering the rear end of said floor to render said feeding means operative at that point.

2. The combination, with a wagon box, of a flexible floor arranged therein and capable of moving vertically, a feeding means operating toward the rear end of said box and normally below the level of said floor, means for lowering the rear end of said floor to render said feeding means operative at that point and successively lowering sections of said floor as the load is discharged, substantially as described.

3. The combination, with a wagon box, of a flexible floor arranged therein and composed of a series of transversely divided sections connected together and capable of moving vertically, of feeding means operating toward the rear end of said box and normally below the level of said floor, and means for lowering the rear end of said floor to render said feeding means operative at that point and successively lowering sections of said floor as the load is discharged.

4. The combination, with a wagon box, of a flexible floor arranged therein and consisting of a series of flexibly connected blocks arranged side by side in rows extending lengthwise of said box and capable of moving vertically, a feeding means operating toward the rear end of said box and normally below the level of said floor, and means for lowering the blocks forming the rear end of said floor successively to render said feeding means operative.

5. The combination, with a wagon box, of a flexible floor arranged therein and capable of moving vertically, a series of feed chains having feed lugs thereon operating through said floor toward the rear end of said box and normally below the level of said floor, and means for lowering the end of said floor to expose said feed lugs and successively lowering sections of said floor as the load is discharged.

6. The combination, with a wagon box, of a flexible floor arranged therein and capable of moving vertically, a feeding means operating toward the rear end of said box and normally below the level of said floor, and belts having teeth thereon and anti-friction rollers to engage said floor and normally hold the same in its raised position, but permitting sections of said floor to drop down and expose said feeding means.

7. The combination, with a wagon box, of a flexible floor arranged therein and composed of a series of blocks arranged in rows lengthwise of said box, the blocks of the same row being flexibly connected with one another and capable of moving vertically, bars arranged between the rows of blocks, feed chains operating on said bars and having upwardly projecting feed lugs normally below the level of said blocks but adapted to be exposed and engage the load when said blocks are lowered, and means for lowering the rear blocks and successively lowering transverse sections of said floor as the load is discharged.

8. The combination, with a wagon box, of a manure spreader frame removably fitting therein, a floor arranged in said frame and capable of vertical movement, feeding means operating toward the rear end of said box and normally below the level of said floor, and means for exposing said feeding means whereby the rear portion only of the load will be acted upon.

9. The combination, with a wagon box, of a frame fitting therein and capable of longitudinal adjustment to adapt it for boxes of different lengths, a flexible floor carried by said frame and capable of vertical movement, a feeding means operating toward the rear end of said box and frame and normally below the level of said floor, and means for lowering the rear end of said floor to permit said feeding means to engage the rear portion only of the load, substantially as described.

10. The combination, with a wagon box, of a flexible floor therein, a feeding means operating toward the rear end of said box, means for rendering said feeding means operative to engage the rear portion only of the load whereby the rear portion of the load will be fed backwardly out of the box without disturbing the forward portion.

11. The combination, with a wagon box, of feeding means operating under the load and within the box and toward its rear end, and means for rendering said feeding means operative to engage the rear portion only of the load, whereby the rear of the load will be fed backwardly out of the box without disturbing the forward portion.

12. The combination, with a wagon, of a frame fitting therein, a vertically movable floor carried by said frame and composed of a series of flexibly connected sections, a feeding means operating toward the rear end of said box and normally below the level of said floor, means for lowering said floor, section by section, to expose said feeding means and permit it to engage the rear portion only of the load, and a spreading reel arranged to receive the material from said feeding means.

13. In a manure spreading apparatus, the combination, with a feeding means, of a spreading reel comprising a shaft, end spiders mounted thereon, a middle spider capable of rotary adjustment, blades attached at one end to said end spiders and having hinged connection at their inner ends with said middle spider.

14. In a manure spreading apparatus, a wagon box having a single compartment, a feeding means operating horizontally in said compartment under the load, and means for rendering said feeding means operative to engage the rear portion only of the load, whereby the rear portion of the load will be fed backwardly without disturbing the forward portion.

15. A manure spreader comprising a wagon box, a feeding means operating under the load, and within said box, and means for rendering said feeding means operative to engage the rear portion only of the load, whereby the rear of the load will be fed backwardly out of the box without disturbing the forward portion.

16. A manure spreader comprising a wagon box having an open rear end and a spreading means located near said open end, and means operating horizontally under the load and adapted to engage the rear portion only of the load whereby said rear portion will be fed backwardly without disturbing the forward portion.

17. The combination with a wagon box, of a removable manure spreader mounted therein and including means operating under and against the load and engaging the rear portion only of the load.

In witness whereof, I have hereunto set my hand this 25th day of January 1908.

LESLIE S. HACKNEY

Witnesses:
G. L. MATTHEWS,
M. H. BRADLEY.